(12) United States Patent
Lee et al.

(10) Patent No.: US 6,338,495 B1
(45) Date of Patent: Jan. 15, 2002

(54) REAR WHEEL SUSPENSION SYSTEM FOR VEHICLES

(75) Inventors: Un-koo Lee; Hyun-ju Bae, both of Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/266,211

(22) Filed: Mar. 10, 1999

(30) Foreign Application Priority Data

Oct. 15, 1997 (KR) .............................................. 97-52755

(51) Int. Cl.[7] ................................................. B60G 3/18
(52) U.S. Cl. ........................ 280/124.143; 280/124.148; 280/86.757
(58) Field of Search ....................... 280/5.524, 124.143, 280/124.135, 124.145, 124.148, 124.138, 86.75, 86.757, 86.758

(56) References Cited

U.S. PATENT DOCUMENTS

| 4,462,609 A | * | 7/1984 | Ohe ..................... 280/124.143 |
| 4,758,018 A | * | 7/1988 | Takizawa et al. ........ 280/5.524 |
| 4,765,647 A | * | 8/1988 | Kondo et al. ......... 280/124.128 |
| 5,098,116 A | * | 3/1992 | Edahiro et al. .......... 280/5.524 |
| 5,116,076 A | * | 5/1992 | Moll ................... 280/124.138 |
| 5,507,510 A | * | 4/1996 | Kami et al. ........... 280/124.148 |
| 6,003,886 A | * | 12/1999 | Kiesel ................... 280/86.757 |

* cited by examiner

Primary Examiner—Kenneth R. Rice
Assistant Examiner—Lynda Jasmin
(74) Attorney, Agent, or Firm—Christie, Parker & Hale, LLP

(57) ABSTRACT

A rear wheel suspension system for vehicles includes a wheel carrier for rotatably supporting a wheel. The wheel carrier has upper, lower, front and rear ends. An upper control arm is provided to connect the upper end of the wheel carrier to a vehicle body, while a lower control arm is provided to connect the lower end of the wheel carrier to a vehicle body. The lower control arm includes front and rear control links, and a trailing arm is disposed in a longitudinal direction with respect to the vehicle body and connecting the front end of the wheel carrier to the vehicle body. When the wheel is aligned such that a toe angle of the wheel becomes "0", the front control link and the trailing arm are aligned such that a longitudinal axis of the front control link of the lower control arm intersects a longitudinal axis of the trailing arm at a wheel center.

4 Claims, 5 Drawing Sheets

REAR WHEEL SUSPENSION SYSTEM FOR VEHICLES

FIELD OF THE INVENTION

The present invention relates to a suspension system for vehicles, and more particularly, to a rear wheel suspension system having a multi-link structure.

BACKGROUND OF THE INVENTION

The suspension system in vehicles improves ride comfort by absorbing shocks received through the wheels when the wheels encounter surface irregularities in the road. In addition to this main capability, suspension systems must also be designed to provide good maneuverability, safety and stability.

Suspension systems comprise one or more control arms connecting the vehicle body to the wheels, and springs and shock absorbers to absorb shocks transmitted from the road surface in the vertical direction. Accordingly, movement of the wheels in relation to the vehicle body is fully supported such that shocks and vibrations resulting from surface irregularities of the road are absorbed, and stability is provided when steering the vehicle.

The suspension system must satisfy three basic criteria: (1) ability to absorb shocks caused by road surface irregularities to provide ride comfort to the driver and passengers; (2) ability to prevent swaying of the vehicle during cornering, acceleration and braking; and (3) ability to maintain an appropriate level of vertical load on a surface of the wheel contacting the road such that vehicle stability is provided while turning, braking and accelerating, even when surface irregularities in the road are encountered.

To improve the above capabilities, a multi-link type suspension system having at least three links has been developed. Such a suspension system effectively absorbs shocks and vibrations transmitted to the vehicle body by its optimal mechanical movement.

However, in the multi-link type suspension system, as the number of parts is increased, the structure thereof is complicated, resulting in an increased size and rising manufacturing costs.

SUMMARY OF THE INVENTION

The present invention has been made in an effort to solve the above problems.

It is an objective of the present invention to provide a rear wheel suspension system for vehicles that can be inexpensively made while improving its shock-absorbing and stabilizing capabilities, as well as maneuverability and steerability of the vehicle.

To achieve the above objective, a rear wheel suspension system for vehicles comprises a wheel carrier for rotatably supporting a wheel, the wheel carrier having upper, lower, front and rear ends, an upper control arm connecting the upper end of the wheel carrier to a vehicle body, a lower control arm connecting the lower end of the wheel carrier to a vehicle body, the lower control arm comprising front and rear control links, and a trailing arm disposed in a longitudinal direction with respect to the vehicle body and connecting the front end of the wheel carrier to the vehicle body. When the wheel is aligned such that a toe angle of the wheel becomes "0", the front control link and the trailing arm are aligned such that a longitudinal axis of the front control link of the lower control arm intersects a longitudinal axis of the trailing arm at a wheel center.

The front wheel suspension may further comprises a toe angle adjuster mounted on the lower control arm to adjust the alignment of the front control link and the trailing arm, thereby adjusting an initial toe angle of the wheel.

The rear control link of the lower control arm is divided into abutting first and second links disposed along a common longitudinal axis, left and right-handed thread portions being formed on abutting end portions of the respective first and second links. The toe angle adjuster comprises a turn buckle engaged with the thread portions of the first and second links so that, when the turn buckle is rotated clockwise or counterclockwise, the first and second links move in a direction away from or toward each other, thereby adjusting a length of the rear control link, whereby an adjustment of the initial toe angle of the wheel is realized.

The toe angle adjuster may further comprises lock nuts respectively engaged with the thread portions of the first and second links at both sides of the turn buckle so as to prevent rotation of the turn buckle caused by external forces after the initial toe angle is adjusted, thereby preventing the initial toe angle from changing from an adjusted value.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1:
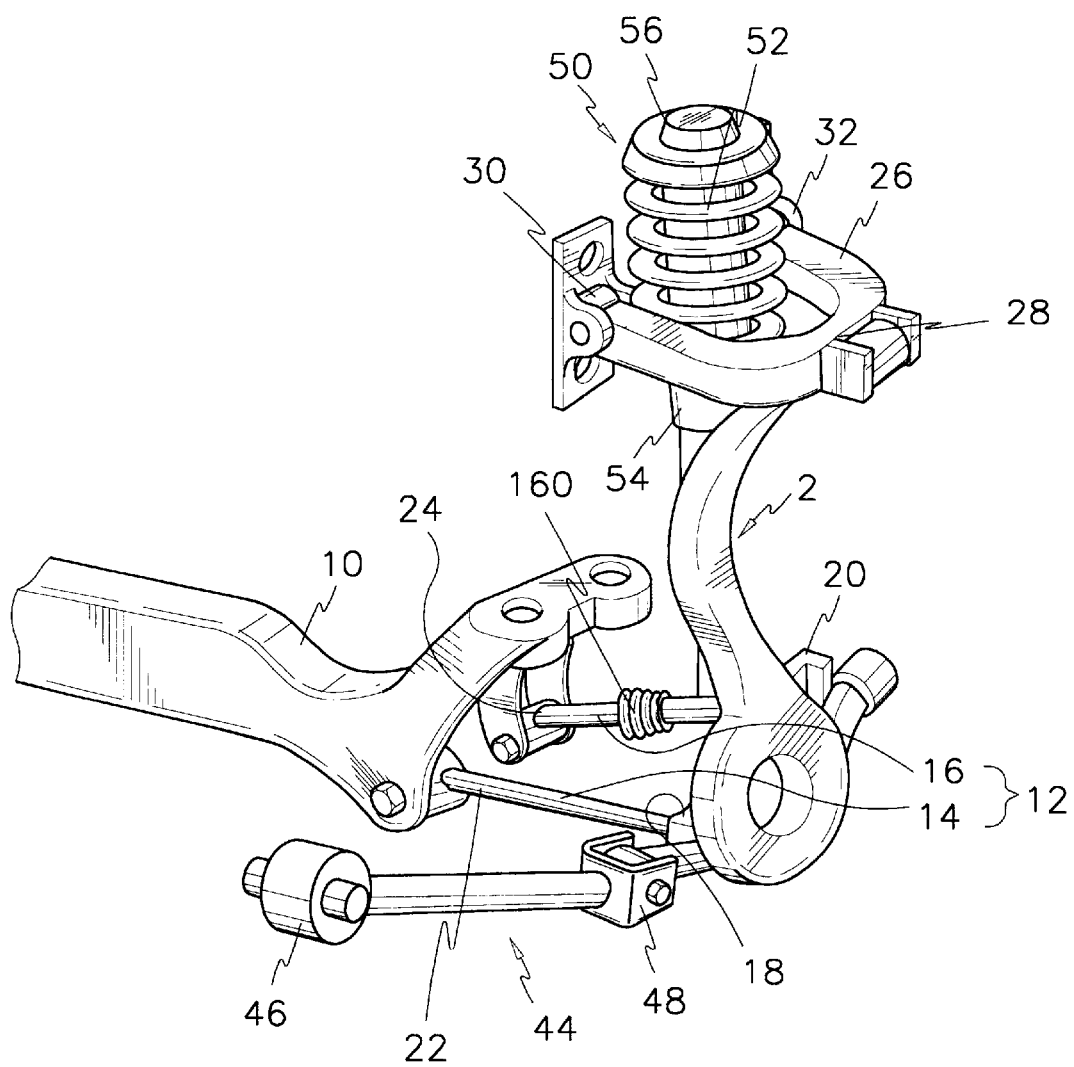
FIG. 1 is a perspective view of a rear wheel suspension system according to a preferred embodiment of the present invention.

Preferred embodiments of the present invention will now be described in detail with reference to the accompanying drawings.

Certain terminology will be used in the following description for convenience and reference only and will not be limiting. The words "front", "rear", "upper" and "lower" will designate directions in the drawings to which reference is made.

Figure 2:
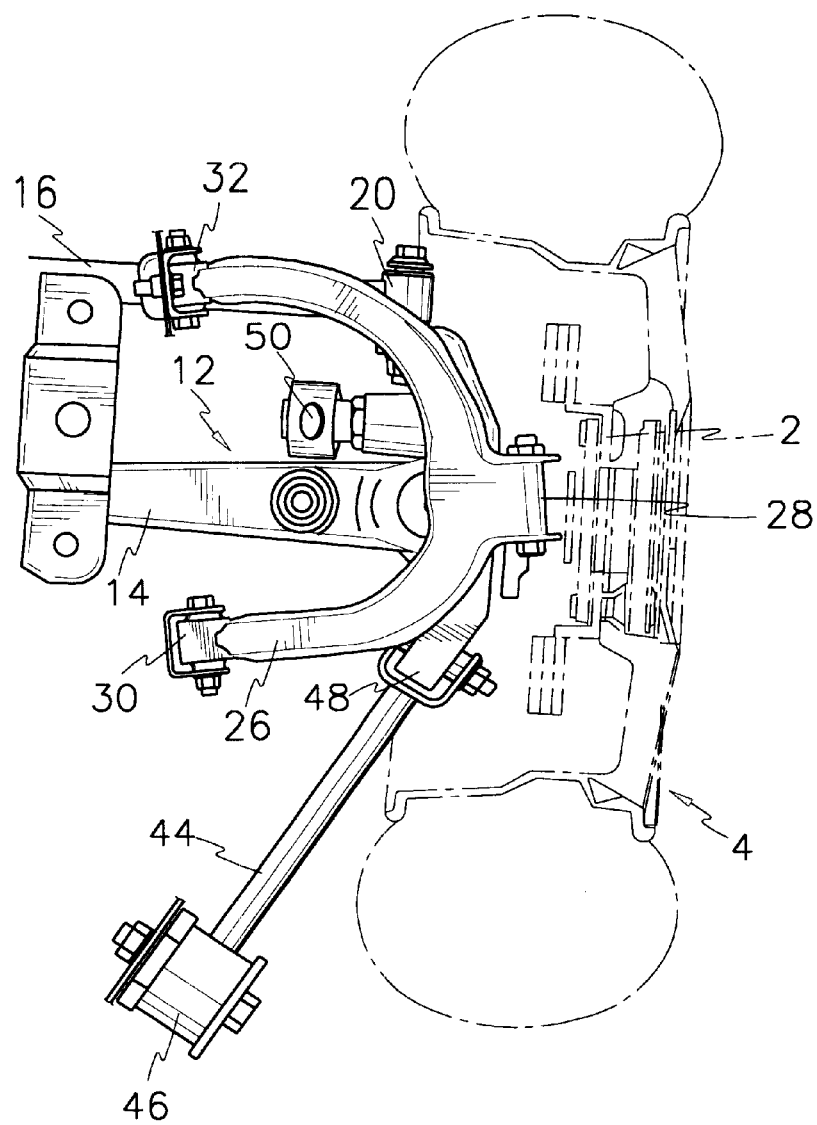
FIG. 2 is a plane view of FIG. 1.
Figure 3:
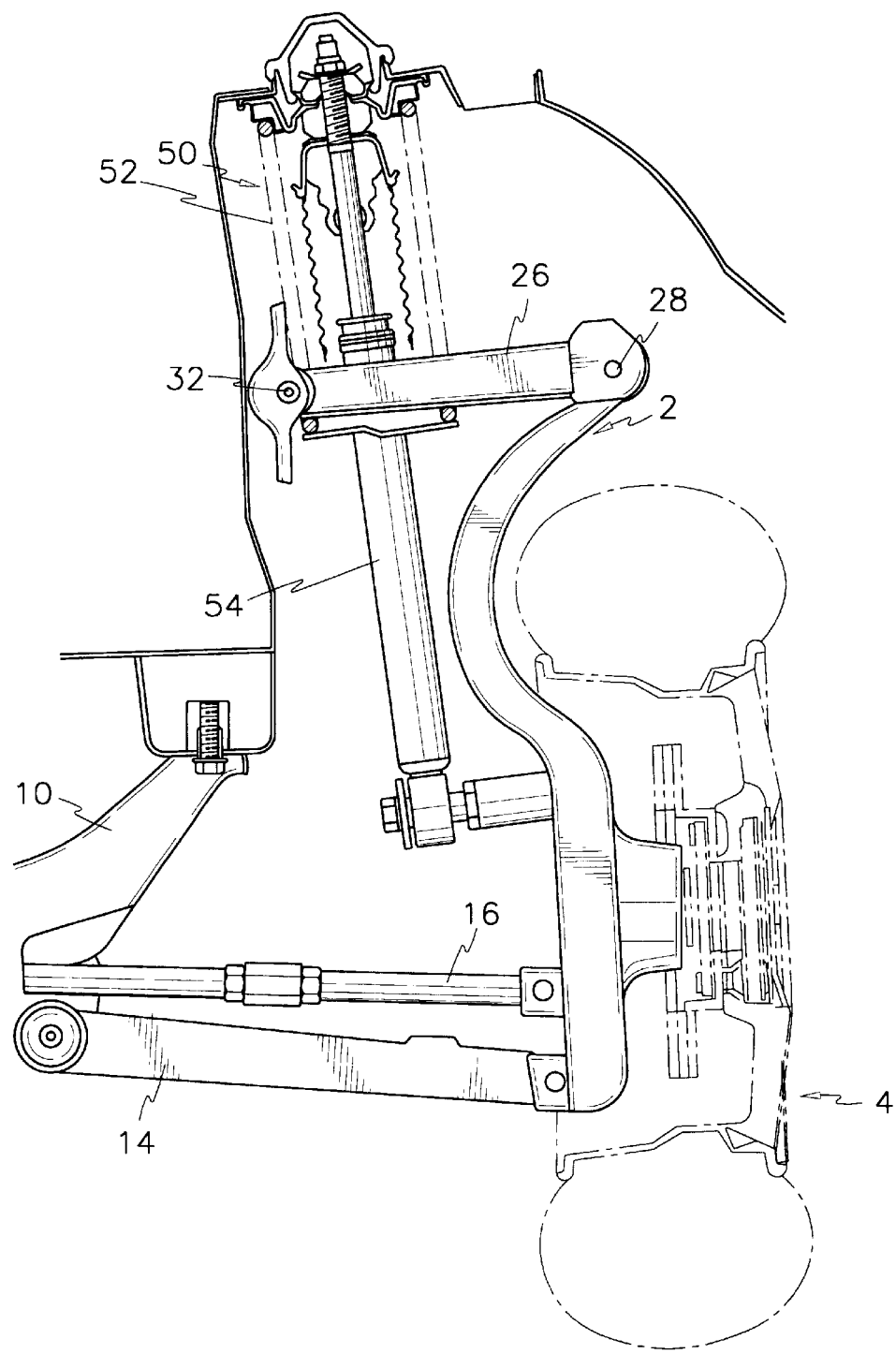
FIG. 3 is a rear view of FIG. 1.

FIGS. 1, 2 and 3 respectively show perspective, plane and rear views of a suspension system according to a preferred embodiment of the present invention.

As shown in the drawings, a suspension system according to a preferred embodiment of the present invention comprises a wheel carrier 2 rotatably supporting a wheel 4, a lower control arm 12 connecting a lower end of the wheel carrier 2 to a sub-frame 10, and an upper control arm 26 connecting an upper end of the wheel carrier 2 to a vehicle body (not shown).

The upper control arm 26 connecting the wheel carrier 2 to the vehicle body is substantially U-shaped, and has a center connecting portion 28 provided approximately at its vertex and end connecting portions 30 and 32 formed on opposing ends of the upper control arm 26. The center connecting portion 28 is coupled to the upper end of the wheel carrier 2 using, for example, a bushing, and the end connecting portions 30 and 32 are coupled to the vehicle body through, for example, bushings. With regard to the center connecting portion 28 and end connecting portions 30 and 32, it is possible to use other coupling structures that enable pivoting of the wheel carrier 2 in a vertical direction.

The lower control arm 12 comprises front and rear control links 14 and 16 spaced away from each other. The front control link 14 includes a first end 18 coupled to a front lower end of the wheel carrier 2 by a bushing and a second end 22 coupled to a front lower end of the sub-frame 10 by a bushing. The rear control link 16 includes a first end 20 coupled to a rear lower end of the wheel carrier 2 by a bushing and a second end 24 coupled to rear lower end of the sub-frame 10 by a bushing.

Figure 4:
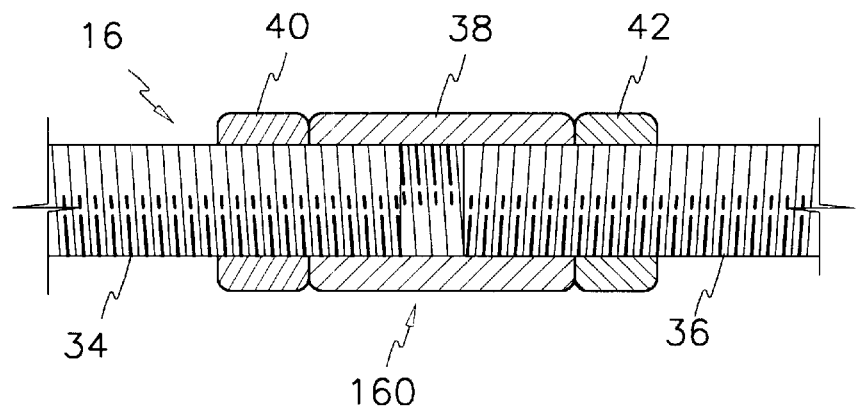
FIG. 4 is a sectional view illustrating a toe angle adjuster of a rear wheel suspension system according to a preferred embodiment of the present invention.

The suspension system further comprises a toe angle adjuster 160 that can adjust an initial toe angle of the wheel 4 when the initial toe angle deviates from a preset level. Describing the toe angle adjuster 160 in more detail with reference to FIG. 4, the rear control link 16 of the lower control arm 12 is divided into first and second links 34 and 36 disposed along a common longitudinal axis, the first and second links 34 and 36 being respectively provided with left and right-handed thread portions around abutting end portions of the first and second links 34 and 36. A turn buckle 38 is engaged with the thread portions of the first and second links 34 and 36 so that, when it is rotated clockwise or counterclockwise, the first and second links 34 and 36 move in a direction away from or toward each other, thereby adjusting a length of the rear control link 16. The adjustment of the length of the rear control link 16 results in an adjustment of the initial toe angle of the wheel 4. In addition, lock nuts 40 and 42 are respectively engaged with the thread portions of the first and second links 34 and 36 at both sides of the turn buckle 38 so as to prevent the inadvertent rotation of the turn buckle 38 caused by external forces after a toe angle is adjusted, thereby maintaining the initial toe angle in its set state.

Referring to again FIGS. 1 to 3, the suspension system further comprises a trailing arm 44 disposed in a longitudinal direction with respect to the vehicle body and connecting a front side of the wheel carrier 2 to the vehicle body. Opposite ends 46 and 48 of the trailing arm 44 are respectively coupled to the wheel carrier 2 and the vehicle body utilizing bushings. The trailing arm 44 receives and absorbs longitudinal force from the wheel 4.

The suspension system further comprises a strut assembly 50 connecting the wheel carrier 2 to the vehicle body in a vertical direction to control an up-and-down motion of the wheel 4. The strut assembly 50 includes a shock absorber 54 and a spring 52 mounted around the shock absorber 54. The strut assembly 50 is coupled at its upper end to the vehicle body with an insulator 56 disposed therebetween and at its lower end to the wheel carrier 2 by a bushing assembly.

Figure 5:
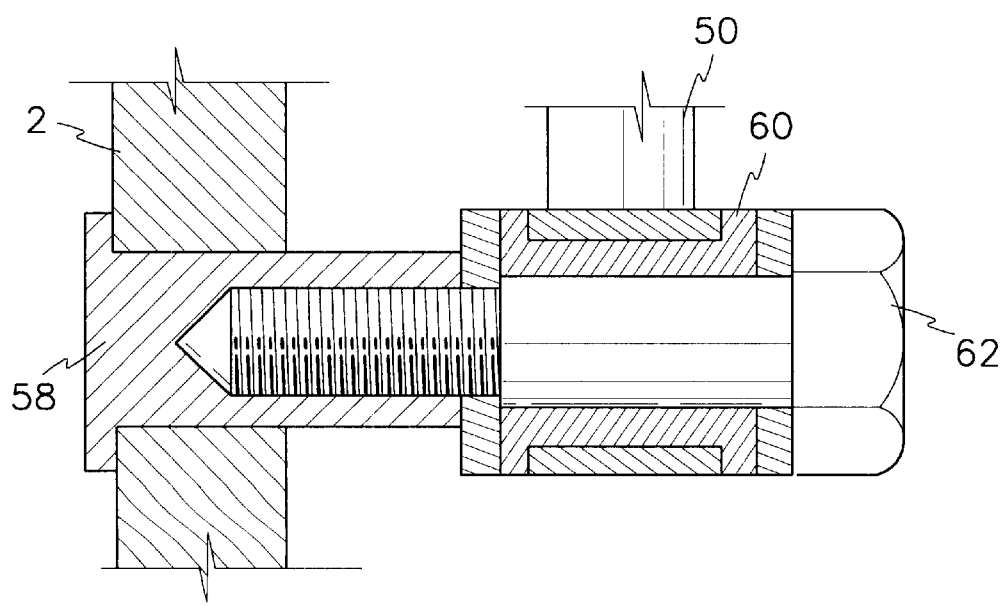
FIG. 5 is a sectional view illustrating a strut assembly fixing structure according to a preferred embodiment of the present invention.

As shown in FIG. 5, the bushing assembly comprises a fixing nut 58 passing through the wheel carrier 2, a rubber bushing 60 mounted on the lower end of the strut assembly 50, and a fixing bolt 62 passing through the rubber bushing 60 and screw-coupled to the fixing nut 58.

Figure 6A:
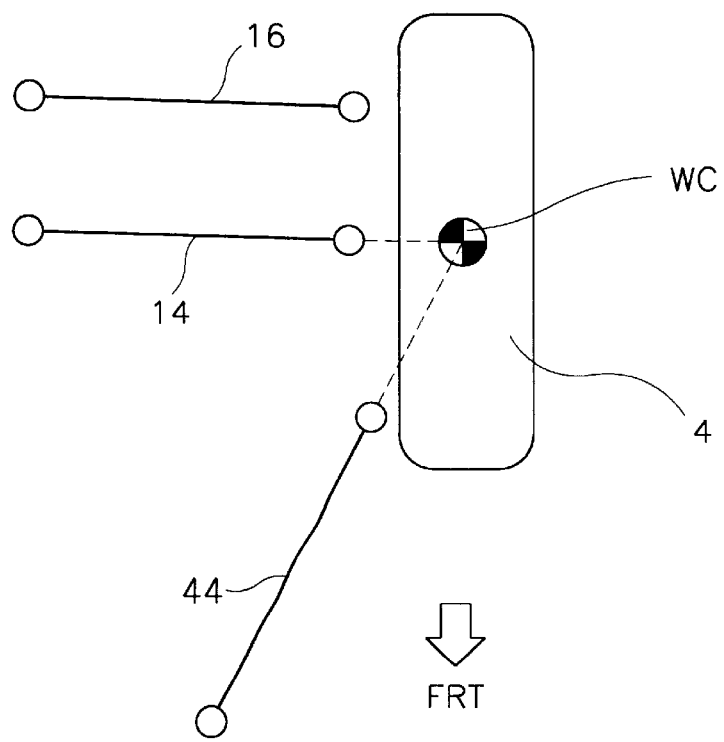
FIGS. 6A and 6B are schematic plane views illustrating the operation of a rear wheel suspension system according to a preferred embodiment of the present invention.

In the above described suspension system, the front control link 14 and the trailing arm 44 are aligned such that a longitudinal axis of the front control link 14 intersects a longitudinal axis of the trailing arm 44 at a wheel center WC as shown in FIG. 6A. The alignment of the front control link 14 and the trailing arm 44 is adjusted by the toe angle adjuster 160.

Figure 6B:
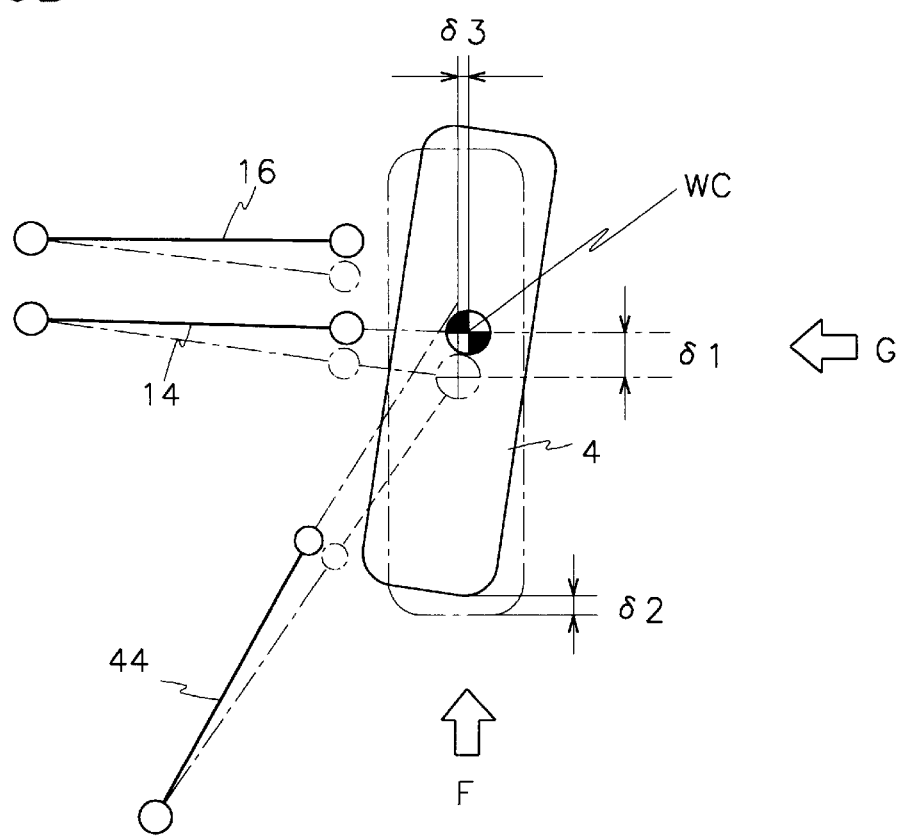

When longitudinal force less than a predetermined value is applied to the wheel 4, a toe angle of the wheel 4 is maintained at zero "0" as shown in FIG. 6A. However, when longitudinal force higher than the predetermined value is applied to the wheel 4, the wheel 4 is pushed rearward, while the front and rear control links 14 and 16 and the trailing arm 44 are pivoted about their respective coupling points to the vehicle body in a counterclockwise direction as shown in FIG. 6B.

Accordingly, the trailing arm 44 pulls a front side of the wheel 4 toward the vehicle body, whereas the front and rear control links 14 and 16 push a rear side of the wheel 4 rearwardly and outwardly. As a result, the wheel 4 is displaced into a toe-in state. This allows the wheel to undergo an under steering state, improving cornering stability and braking stability in a turn.

Describing more in detail, when longitudinal force above the predetermined level is applied to the wheel in a rearward direction, a displacement $\delta 2$ of the wheel 4 in a rearward direction is less than a displacement $\delta 1$ of the wheel center WC by pivotal motions of the trailing arm 44 and the front and rear control link 14 and 16, while the wheel center WC is displaced outward by $\delta 3$. As a result, the wheel 4 is changed into the toe-in state.

In the above, if longitudinal force less than the predetermined level is applied to the wheel 4, the wheel 4 is not changed into the toe-in state as a result of a hardness of the bushings of the trailing arm 44 and the front and rear control links 14 and 16. Therefore, as the vehicle drives at low speeds, the wheel 4 undergoes a neutral steer or a bit of an over steer, improving steering characteristics. However, as vehicle speed increases, thereby increasing longitudinal force, the intersection point between the line extending from the longitudinal axis of the front control link 14 and the line extending from the longitudinal axis of the trailing arm 44 is displaced away from the wheel center WC rearwardly and outwardly. This allows the vehicle to undergo under steering at high speeds, improving cornering stability and braking stability in a turn.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A rear wheel suspension system for vehicles, comprising:

a wheel carrier for rotatably supporting a wheel, the wheel carrier having upper, lower, front and rear ends;

an upper control arm connecting the upper end of the wheel carrier to a vehicle body;

a lower control arm connecting the lower end of the wheel carrier to a vehicle body, the lower control arm comprising front and rear control links, each control link being independently pivotably connected to the wheel carrier and being movable relative to the other control link; and a trailing arm disposed in a longitudinal direction with respect to the vehicle body and connecting the front end of the wheel carrier to the vehicle body, wherein, when the wheel is aligned such that a toe angle of the wheel becomes "0", the front control link and the trailing arm are aligned such that a longitudinal axis of the front control link of the lower control arm intersects a longitudinal axis of the trailing arm at a wheel center.

2. The rear wheel suspension system of claim 1 further comprising a toe angle adjuster mounted on the lower control arm to adjust the alignment of the front control link and the trailing arm, thereby adjusting an initial toe angle of the wheel.

3. The rear wheel suspension system of claim 2 wherein the rear control link of the lower control arm is divided into abutting first and second links disposed along a common longitudinal axis, left and right-handed thread portions being formed on abutting end portions of the respective first and second links, and wherein the toe angle adjuster comprises a turn buckle engaged with the thread portions of the first and second links so that, when the turn buckle is rotated clockwise or counterclockwise, the first and second links move in a direction away from or toward each other, thereby adjusting a length of the rear control link, whereby an adjustment of the initial toe angle of the wheel is realized.

4. The rear wheel suspension system of claim 3 wherein the toe angle adjuster further comprises lock nuts respectively engaged with the thread portions of the first and second links at both sides of the turn buckle so as to prevent rotation of the turn buckle caused by external forces after the initial toe angle is adjusted, thereby preventing the initial toe angle from changing from an adjusted value.

\* \* \* \* \*